United States Patent Office 3,224,889
Patented Dec. 21, 1965

3,224,889
ANTI-STATIC HIGH MOLECULAR
WEIGHT COMPOUNDS
Felix Schülde, Neuenhain, Taunus, and Dietrich Schleede, Frankfurt am Main, Germany, assignors to Farbwerke Hoechst Aktiengesellschaft vormals Meister Lucius & Brüning, Frankfurt am Main, Germany, a corporation of Germany
No Drawing. Filed Dec. 6, 1961, Ser. No. 157,573
Claims priority, application Germany, Dec. 17, 1960, F 32,783
3 Claims. (Cl. 106—177)

The present invention relates to a process for the anti-static finishing of high molecular weight compounds.

Shaped articles of any kind of high molecular weight materials, for example synthetic plastics, have a tendency towards electrostatic charging particularly when the material used possesses very good electric properties. Owing to this electrostatic charging these shaped articles, when used in practice, already exhibit dust deposits at the surface after a short time which deposits, in the case of a strong electrostatic charging, show the well-known zigzag design or crow's feet. Owing to this strong electrostatic charging, moreover, sparking may occur on account of the great potential difference.

In the case of fibers or fabrics the static charge manifests itself by rapid and strong dirtying of said fibers or fabrics. Owing to these disadvantages of the static charge, the use of such polymers may become uninteresting.

Many processes are known according to which electrostatic charging can be prevented or at least diminished. Thus it has been known for a long time, for example, to condition shaped articles after their fabrication, i.e. to expose them to moist air. Injection-molded pieces or fibers, for example of polyamide, cellulose acetate or viscose that are to be rendered resistant to electro-static charge, absorb water to a certain extent by this treatment whereby the electric conductivity is strongly increased.

Apart from the fact that some plastics, for example polyolefins, practically absorb no water and the shaped articles of this material cannot be rendered resistant to electro-static charge in such a manner, this method also has the disadvantage that the water content of the plastics articles is reversible, i.e. the anti-static effect is lost when storing the articles treated in this manner in a dry atmosphere.

Since it is in most cases not sufficient to expose the shaped articles to moist air in order to obtain an anti-static effect, various processes have been developed in which the plastics material or the surface of the shaped articles made therefrom is modified by means of anti-static agents in such a manner that the static charge is diminished. Quite a number of compounds have been proposed for this purpose. These compounds can be classified in the following five groups:

(1) Nitrogen-containing compounds such as amines, amides and quaternary ammonium salts,
(2) Sulfonic acids and aryl-alkyl-sulfonates,
(3) Phosphoric acids and aryl-alkyl phosphates, as well as phosphoric acid ester amides,
(4) Polyglycols and the derivatives thereof including polyglycol esters of fatty acids as well as polyglycol aryl alkyl ethers,
(5) Polymers of multivalent alcohols and the derivatives thereof.

The anti-static agents can, depending on the kind of agent, either be applied to the shaped article made of plastics materials by treating them with a solution of said agents, or they may be incorporated by admixing the respective agents to the plastics powder prior to its processing.

It is also known to incorporate strongly hygroscopic inorganic salts but this is not generally done on account of the risk connected therewith of corrosion occurring on the processing machines.

The subsequent treatment of shaped articles of plastics materials with solutions having an anti-static effect has serious drawbacks:

The anti-static effect generally depends on the content of water vapor of the atmosphere. The adhesion of the subsequently applied compounds is insufficient in the case of the compounds known hitherto so that they are effective during a limited period only on account of abrasion and when being used everyday. Moreover, the danger exists that the surface of the material is changed. Some of the anti-static agents to be applied are exceedingly hygroscopic so that they absorb an unnecessarily large amount of water. They are, moreover, in most cases not harmless from a physiological point of view.

An anti-static treatment by incorporating the anti-static agents has the advantage that it is possible at any time to finish high molecular weight materials on demand with anti-static agents also after their polymerization. In order to attain a sufficient anti-static effect the already known organic compounds that are capable of being incorporated must, however, be added in amounts which entail a modification of the characteristic properties of the plastics material such, for example, as a decrease of the temperature ranges suitable for the processing, a reduction of the hardness, the rigidity, the thermostability under load, a deterioration of the color, etc. In many cases the compounds concerned are agents by whose incorporation the high molecular weight material finished therewith loses its physiological harmlessness.

Really effective anti-static agents that can be applied on an industrial scale for the incorporation in synthetic plastics are not known hitherto.

Another possibility of rendering high molecular weight materials resistant to electro-static charge consists in incorporating additives during the polymerization. This method has the disadvantage that the high molecular weight material is finished by means of anti-static agents already in the manufacturing process, while the fabricator can in many cases decide only shortly before the final shaping whether an anti-static finishing is required for the desired purpose, or whether the slight deterioration of the electrical properties connected therewith is unwelcome. Moreover, by adding the hitherto known additives during the polymerization the characteristic properties of the materials, for example the absorption of water, the chemical resistance, toughness and hardness are modified in many cases.

Now we have found that for the anti-static finishing of organic high molecular weight compounds there may be used as anti-static agents organic phosphorus amides of the general formula

in which X represents =O or =S. The substituent X may be dispensed with entirely, Y may be

or the respective ammonium salts or $R_2$; Z=Y while the two radicals need not be equal; $R_1$ represents —H or alkyl, preferably methyl; $R_2$ represents —H or erably alkyl (containing 1 to 20 carbon atoms), but it may also mean cycloalkyl, aryl or alkylaryl.

When $R_1$ and $R_2$ represent hydrocarbon radicals, they may also be substituted. As substituents there enter into consideration, for example: halogen, amino groups, substituted amino groups, oxy groups, alkoxy groups, thio ether, mercaptane groups, sulfonamide groups, carboxy alkyl groups, aromatic and heterocyclic substituents.

The concentration of the phosphorus compounds in the plastics material may advantageously amount to 0.1 to 7% by weight, preferably 0.5 to 4% by weight. Smaller amounts may also be sufficient.

Phosphorus amides in which $R_1$ and $R_2$ represent aliphatic radicals or H generally have the best anti-static effect above all in those cases in which $R_1$ represents a methyl group and $R_2$ a longer alkyl radical such as, for example, the stearyl or dodecyl radical, and X or Y represent alkyl radicals or amines substituted with alkyl radicals. As such compounds there are mentioned, for example, phosphorus acid-N-methylstearylamide-diamide. Compounds with aromatic or cycloaliphatic hydrocarbon radicals partially exhibit a lower efficacy. As shown in Example 8, compounds containing aromatic substituents may also be excellent anti-static agents. Whether the efficacy of these compounds depends on the fact that at the high working temperatures a splitting off of the aromatic residues takes place and a phosphorus amide which is free from aromatic groups then acts as an antistatic agent in the final product, or whether the compounds in themselves are effective, does not play a decisive role for the desired improving effect.

As suitable anti-static agents there may, for example, be used the following compounds, without limiting the process to these compounds:

Phosphoric acid-N-methylstearylamide-diamide, phosphoric acid-tri-N-dimethylamide, phosphoric acid tridodecylamide, phosphoric acid tristearylamide, phosphoric acid dibutylamide-diamide, phosphoric acid dodecylamide-diamide, nonylphosphonic acid - methylstearylamide-amide, octylphosphonic acid-distearylamide, and octylphosphonous acid-N-methylstearylamide.

It is a special advantage of the present invention that quite a category of compounds are described as anti-static agents so that of the great number of effective products there may, according to requirements, be chosen compounds particularly suited for a certain synthetic plastic or for a special field of application. According to the special requirements of the services there may be chosen compounds which, on account of their solubility in water or organic solvents or in the synthetic plastic itself, or owing to their color decomposition, melting or boiling temperature, etc., yield final products having optimum properties. In many cases it may also be advantageous to use mixtures of two or several of the phosphorus amides mentioned above.

For the industrial utilization of a product the manufacturing process and, connected therewith, the economy of the process plays a decisive role. From the great range of the anti-static phosphorus amides that may be used it is easy to choose products that fulfill the requirements with regard to economy.

In German patent application as laid open to public inspection No. 1,091,078 there is described the subsequent anti-static finishing of filaments and sheets with solutions of phosphoric acid ester amides. As compared with that application the present invention has considerable advantages. Thus the subsequent anti-static finishing with phosphoric acid ester amides displays the disadvantages mentioned above. In the subsequent application of the anti-static agents it is only attempted to finish the surface of the plastics parts in such a manner that the electrostatic charge can flow off by reducing the surface resistivity.

In the present invention, however, the transmission resistivity is decreased by the incorporation of the compounds enumerated.

The transport of electrical charge is dependent in a much higher degree on the transmission resistivity, so that in this manner static charging is not only avoided permanently but also the charge is no longer primarily influenced by the moisture content of the surroundings.

When adding small amounts of the cited compounds to the plastics materials an anti-static effect is already achieved so that shaped articles made from such mixtures no longer charge at the surface and no longer exhibit a tendency towards attracting dust. The mechanical and thermal properties, the thermostability under load as well as the color and transparency of the polymers remain practically unaltered by an addition of the said compounds while the fastness to light is partially even improved.

The working conditions and the range of temperature in which the synthetic plastics can be shaped by a thermoplastic process remain the same. Moreover, the products are for the greater part odorless and well compatible with all polymers. Furthermore, the greater part of the compounds described is physiologically harmless; for example in the case of the phosphoric acid-N-methylstearylamide-diamide the test as to acute toxicity showed a value of $LD_{50}=10$ g./kg. The anti-static effect attainable is independent of the moisture of the surroundings and of a practically unlimited duration. The surface does not become hydroscopic but remains unchanged. Some of the electric properties of the polymers are influenced by the addition of the anti-static agents for this constitutes their anti-static efficacy. The deterioration of the specific transmission, and, in some cases, also of the surface resistivity as well as the dielectric properties is so trifling that in most cases it is of no importance even for the application of the polymers in the field of electrical engineering.

By adding compounds of the category as described above all high molecular weight materials can be improved that have the tendency of getting dirty by attracting dust owing to electrostatic charging. These compounds exhibit a particularly good efficacy, for example, in polystyrene and in the copolymers of styrene with butadiene and/or acrylonitrile and/or vinyl carbazole, in polyvinyl chloride and vinyl chloride copolymers, polyterephthalates, polyolefins, such as the polymers and copolymers of ethylene, propylene, butene-(1), pentene-(1), 4-methyl-pentene-(1), hexene-(1), 5,5-dimethyl-hexene-(1), octadecene-(1), 4-phenylbutene-(1) as well as vinylcyclohexene, polycarbonates, polyacrylonitrile, polyacrylic acid esters, polymethacrylic acid esters, polyamides, polyurethanes, polyvinyl esters, polyacetals, polymers of fluoroolefins, cellulose derivatives and polymer mixtures containing the enumerated polymers. Also unsaturated polyesters and epoxy resins hardened with reagents having a basic character as well as raw materials for lacquers can without difficulties acquire an anti-static finishing prior to or during their processing by an addition of the compounds cited. However, when processing the polyester resins it may, after the addition of the anti-static agents, become necessary to carry out the operation with hardening/accelerating systems differing from those usually employed. The compounds of the said category can be added prior to or during the polymerization, and also later on to the pulverulent high molecular weight polymer as well as to the granular product. Depending on the nature of the synthetic plastics the compounds can be admixed in the melt, in solution and by application to the pulverulent or granular high molecular weight polymer. The admixture is most advantageously effected prior to or during the processing. It was found that the technique of incorporation is of little importance. It is important, however, that the anti-static agents are distributed in the synthetic plastic as evenly as possible. Application during the polymerization is also possible.

The high molecular weight polymers provided with an anti-static finishing can be processed by all customary processing methods, for example on molding presses, injection molding machines or extruders. From these high molecular weight polymers, there can be made, for example, compression- and injection-molded articles, semi-finished goods, sheets, inflated hollow articles, tubes, fibers, filaments, monofilaments, etc. The resins admixed with the compounds mentioned above can be processed in the usual manner as resin varnish or casting resin or in combination with glass fibers and/or fillers.

The high molecular weight polymers finished in this manner are especially interesting for packaging purposes (packing-material, canisters, bottles, beakers), as accessories for vacuum-cleaners, band-conveyors, showroom patterns and masters, parts for casings (for example for radio and television sets, vacuum cleaners), electric installations such as lighting fixtures, cable insulations, plugs, switches or armatures, air conditioning and ventilating equipments, plastics table ware, kitchen machinery, filaments, fibers, fabrics, sheets, lacquers, that is to say in all those cases in which an anti-static finishing is required.

The anti-static effect of inorganic or organic compounds in high molecular weight materials can be determined most easily by means of cigarette ash. For testing these materials plates obtained by extrusion, injection- or compression-molding are vigorously rubbed with a woolen cloth for about 15 seconds and held about 2 mm. above powdery cigar or cigarette ash. When the extruded or molded plates have good anti-static properties, they do not attract cigarette ash.

Another method for determining the electrostatic charge consists in measuring the specific transmission resistivity. An attraction of cigarette ash was no longer observed when the transmission resistivity had a value of about $10^{13}$ ohms/cm. Quite a number of further methods are known for determining the electrostatic charge, but it was found that only the two test methods mentioned above furnish genuine values which approach those found in practice.

The following examples serve to illustrate the invention but they are not intended to limit it thereto, the parts being by weight:

EXAMPLES

Several anti-static compounds corresponding to the summation formula explained in the description were incorporated in various high molecular weight polymers. The anti-static agents used in Examples 1 to 13, the amounts added thereof and the test results are listed in Table 1.

TABLE 1

| Ex. No. | Thermosetting or thermoplastic high molecular weight compound | Transmission resistivity of the plastics material ohms/cm. | Anti-static agent | Formula | Addition percent | Transmission resistivity after the addition ohms/cm. | Attraction of ash* |
|---|---|---|---|---|---|---|---|
| 1 | Polystyrene | $10^{16}$ | Octylphosphonous acid-N-methylstearylamide | 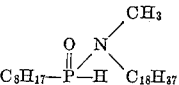 | 1 | $1 \cdot 10^{13}$ | — |
| 2 | Acrylonitrile/styrene copolymer | $10^{16}$ | Phosphoric acid-tristearyl-amide | 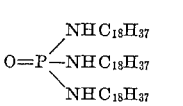 | 1 | $1 \cdot 10^{13}$ | — |
| 3 | Butadiene/styrene copolymer | $10^{16}$ | Phosphoric acid dedecyl-amide-diamide | 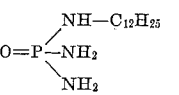 | 0,5 | $1 \cdot 10^{12}$ | — |
| 4 | Polyglycolterephthalate | $10^{15}$ | Octylphosphonic acid-di-(stearyl-methylamide) | 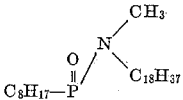 | 1.5 | | — |
| 5 | Branched (high-pressure)-polyethylene | $10^{18}$ | Phosphoric acid-methyl-dodecylamide-diamide | 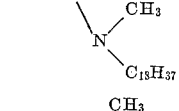 | 1.5 | $1 \cdot 10^{14}$ | — |
| 6 | Linear (low-pressure)-polyethylene | $10^{16}$ | Phosphoric acid-tri-N-dimethylamide | 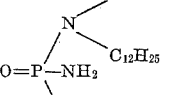 | 1 | $1 \cdot 10^{13}$ | — |
| 7 | Polypropylene | $10^{18}$ | Phosphoric acid-triethylamide | 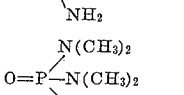 | 0.75 | $1 \cdot 10^{12}$ | — |
| 8 | Polybutene-1 | $10^{18}$ | Phosphoric acid-N-methyl-stearylamide-dianilide | 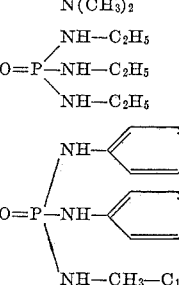 | 1.0 | $1 \cdot 10^{13}$ | — |

Footnote at end of table.

TABLE 1—Continued

| Ex. No. | Thermosetting or thermoplastic high molecular weight compound | Transmission resistivity of the plastics material ohms/cm. | Anti-static agent | Formula | Addition percent | Transmission resistivity after the addition ohms/cm. | Attraction of ash* |
|---|---|---|---|---|---|---|---|
| 9 | Polyvinyl chloride with 30% dioctyl phthalate. | $10^{12}$ | Phosphoric acid-tridodecyl-amide. | $O=P(NHC_{12}H_{25})_3$ | 1.25 | $1 \cdot 10^{11}$ | — |
| 10 | Polycarbonate | $10^{17}$ | Octylphosphonic acid-stearylmethyl-amide-amide. | $C_8H_{17}-P(=O)(N(CH_3)C_{18}H_{37})(NH_2)$ | 1.0 | $1 \cdot 10^{13}$ | — |
| 11 | Epoxide resin (hardened with reagents having a basic character). | $10^{19}$ | Thiophosphoric acid-methyl-octylamide-di-(methyl amide). | $S=P(N(CH_3)C_8H_{17})(NHCH_3)_2$ | 0.75 | $1 \cdot 10^{13}$ | — |
| 12 | Polyester resin as glass fiber laminate or as lacquer coat. | $10^{16}$ | Thiophosphoric acid-N-methyl-stearylamide-diamide. | $S=P(N(CH_3)C_{18}H_{37})(NH_2)_2$ | 0.5 | $1 \cdot 10^{13}$ | — |
| 13 | Polypropylene | $10^{18}$ | N-methylstearylamide- | $P(N(CH_3)C_{18}H_{37})(NH_2)_2$ | 1.0 | $1 \cdot 10^{13}$ | — |

*—=No attraction of ash. +=Attraction of ash.

The specific transmission resistivity of the injection-molded plates was measured according to DIN (German Industrial Standards) 53482 and the tendency of said plates to attract cigarette ash was tested by rubbing them with a woolen cloth.

The anti-static agents were incorporated in the following manner:

*Examples 1, 5, 8 and 13*

10 kilos each of the respective plastics material were mixed with the indicated amounts of the anti-static agents on an impeller, extruded into bands, worked up into granules and injection-molded into 1 mm. thick plates.

*Examples 2, 3 and 10*

The indicated amounts of the anti-static agent were applied in a puverulent state to 10 kilos of the indicated plastics granular product according to the dry dyeing process. A roller vat was used as a means for applying the anti-static agent. The material treated in this manner was then extruded, worked up into granules and injection-molded into 1 mm. thick plates.

*Example 4*

Octyl phosphonic acid di-(stearylmethylamide) in the form of a 10% methanolic solution was added to polyethylene glycol terephthalate. After evaporation of the solvent and drying of the mixture, the material was spun in the usual manner.

*Example 6*

In a mixer 75 grams of liquid phosphoric acid tri-N-dimethylamide were introduced through nozzles into 10 kilos of linear (low-pressure) polyethylene powder. After thorough homogenizing the mixture was worked up into granules which were injection-molded into plates.

*Example 7*

10 kilos of polypropylene powder were mixed in a mixer with 750 grams of a hot 10% solution of phosphoric acid triethylamide in ethanol. After evaporation of the solvent at 90° C., the mixture was worked up into granules which were injection-molded into plates.

*Example 9*

210 grams of polyvinyl chloride powder were mixed with 90 grams of dioctyl phthalate and 3.75 grams of phosphoric acid tridodecylamide dissolved in 6 grams of an epoxy stabilizer. This mixture was plasticized on a roll mill and then compression-molded into 1 mm. thick plates.

*Example 11*

200 grams of a commercial epoxy resin on the basis of 4,4'-diphenylol propane+epichlorhydrine having an epoxide equivalent of 190 were mixed with 16 grams of diethylene triamine and 7.5 grams of a 20% solution of thiophosphoric acid methyloctylamide di-(methylamide)

in dibutyl phthalate. The mixture was cast into a plate and hardened at room temperature.

*Example 12*

200 grams of a commercial unsaturated polyester resin which was obtained by condensation of 5 moles of ethylene glycol with 3 moles of maleic anhydride and 2 moles of phthalic anhydride and final dissolution of the condensation product in 30% by weight of styrene, was cast into plates after the addition of 2% of methyl ethyl ketone peroxide, 0.1% of cobaltous naphthenate as well as 0.5% of thiophosphoric acid-N-methylstearylamide-diamide and hardened at room temperature with the exclusion of air.

Table 1 which lists the test results shows that an excellent anti-static effect can be attained with all of the compounds enumerated.

*Example 14*

10 kilos of isotactic polypropylene (density 0.905) were mixed, respectively, with varying amounts of phosphoric acid-N-methylstearylamide-diamide on an impeller, extruded into bands, worked up into granules which were injection-molded into 1 mm. thick plates. The specific transmission resistivity of these plates was measured according to DIN (German Industrial Standards) 53482. As shown in Table 2, the degree of the anti-static effect depends on the amount of the phosphoric acid-N-methylstearylamide-diamide added (cf. the values of the specific transmission resistivity).

TABLE 2

| Addition of phosphoric acid-N-methylstearyl-amide-diamide in percent | 0 | 0.25 | 0.5 | 0.75 | 1.0 | 1.5 | 4.0 | 10 |
|---|---|---|---|---|---|---|---|---|
| Specific transmission resistivity in ohms/cm. (DIN 53482) | $10^{18}$ | $1.2 \cdot 10^{15}$ | $6.7 \cdot 10^{13}$ | $1.1 \cdot 10^{13}$ | $9.7 \cdot 10^{12}$ | $4.8 \cdot 10^{12}$ | $4.5 \cdot 10^{12}$ | $4.5 \cdot 10^{12}$ |
| Attraction of cigarette ash after rubbing the plates with a woolen cloth | (1) | (2) | (3) | (4) | (4) | (4) | (4) | (4) |

1 Strong.  2 Little.  3 Very little.  4 No attraction.

*Example 15*

Pulverulent isotactic polypropylene (density 0.905) was mixed on an impeller with 0.5% of phosphoric-acid-N - methylstearylamide - diamide, extruded into bands, worked up into granules and injection-molded into 1 mm. thick plates. The specific transmission resistivity of the plates obtained amounted to $5-7 \cdot 10^{13}$ ohms/cm. after 5 days' storage in moist air (60% of relative air moisture at 20° C.) as well as after 5 days' storage in the desiccator. This test shows that the degree of the anti-static effect is independent of the moisture content of the surroundings.

*Example 16*

75 grams of phosphoric acid-N-methylstearylamide-diamide (melting point 106°–108° C.) were applied in the form of a powder according to the dry dyeing process to 10 kilos of polystyrene granules (density: 1.05 g./cm.², Martens temperature 69° C., specific transmission resistivity $10^{16}$ ohms/cm.). A roller vat served as a means for applying the anti-static agent. The material thus obtained was then extruded, worked up into granules and injection-molded into 1 mm. thick plates.

The specific transmission resistivity of the polystyrene plates finished with an anti-static agent was $10^{13}$ ohms/cm. After the plates had been rubbed vigorously with a woolen cloth they did not attract cigarette ash.

*Example 17*

10 kilos of a granular styrene-acrylonitrile copolymer (density: 1.08 g./cm.², Martens temperature 75° C., specific transmission resistivity $10^{16}$ ohms/cm.) were finished with 75 grams of phosphoric acid-N-methylstearyl-amide-diamide in the same manner as described in Example 16 in order to acquire anti-static properties, and the material was injection-molded into plates.

The plates had a specific transmission resistivity of $10^{11}$ ohms/cm. After being vigorously rubbed with a woolen cloth the plates did not attract cigarette ash.

*Example 18*

As described in Example 16, 75 grams of phosphoric acid-N-methylstearylamide-diamide were added to 10 kilos of a commercial copolymer of styrene and butadiene (density: 1.06, Martens temperature 68° C., specific transmission resistivity $10^{16}$ ohms/cm.) and injection-molded into plates.

The plates had a specific transmission resistivity of $10^{11}$ ohms/cm. After being vigorously rubbed with a woolen cloth the plates did not attract cigarette ash.

*Example 19*

10 kilos of a granular mixture of a styrene/acrylonitrile copolymer and a butadiene/acrylonitrile copolymer (density: 1.12 g./cc., Martens temperature 70° C., specific transmission resistivity $5 \cdot 10^{14}$ ohms/cm.) were finished, as indicated in Example 16, with 75 grams of phosphoric acid-N-methylstearylamide-diamide to acquire anti-static properties, and the material was injection-molded into plates.

The injection-molded plates had a specific resistivity of $10^{11}$ ohms/cm. An attraction of cigarette ash was not observed even when the plates had been rubbed vigorously with a woolen cloth.

*Example 20*

200 grams of polyvinyl chloride powder (K-value 69) were mixed with 4 grams of dibutyl-tin-bis-(thioglycolic acid-octylester) and 2 grams of phosphoric acid-N-methylstearylamide-diamide dissolved in 4 grams of an epoxy stabilizer. This mixture was plasticized on a roll mill and then compression-molded into a 1 mm. thick plate.

While a comparative plate without the addition of phosphoric acid-N-methylstearylamide-diamide attracted cigarette ash after being vigorously rubbed with a woolen cloth, the plate obtained as described in this example did not attract cigarette ash.

*Example 21*

200 grams of a polyvinyl chloride powder (K-value 69) were stirred into 20 grams of a 10% solution of phosphoric acid-N-methylstearylamide-diamide in ethanol and the solvent was evaporated at 90° C. After the addition of 4 grams of dibutyl-tin-bis-(thio-glycolic-acid-octylester) and 4 grams of an epoxide resin as a stabilizer the mixture was plasticized on a roll mill and compression-molded into a 1 mm. thick plate.

While a comparative plate without the addition of phosphoric acid-N-methylstearylamide-diamide attracted cigarette ash after being vigorously rubbed with a woolen cloth, the plate finished with an anti-static agent did not exhibit a charge that could be measured with cigarette ash.

Example 22

In a pilot-plant a solution of polyacrylonitrile (K-value 87) in dimethyl formamide with an addition of 2% of phosphoric acid-N-methylstearylamide-diamide was spun in the usual manner.

Even when the monofilaments which had been wound on a bobbin were rubbed vigorously, said monofilaments did not attract cigarette ash.

Example 23

1.5% of phosphoric acid-N-methylstearylamide-diamide in the form of a 10% methanolic solution were added to polyethylene glycol terephthalate (specific viscosity: 800). After evaporation of the solvent and drying of the mixture the material was spun in the usual manner. The fibers obtained in this manner did not exhibit a static charge that could be detected by means of cigarette ash.

Example 24

10 kilos of linear (low-pressure) polyethylene powder (density: 0.96 g./cc., specific transmission resistivity $10^{18}$ ohms/cm.), were, as described in Example 14, finished with 75 grams of phosphoric acid-N-methylstearylamide-diamide in order to acquire antistatic properties.

The specific transmission resistivity of the injection-molded plates finished in this manner was $10^{12}$ ohms/cm. When tested the plates did not attract cigarette ash.

Example 25

10 kilos of linear (low-pressure) polyethylene powder (density: 0.96 g./cc., specific transmission resistivity $10^{18}$ ohms/cm.) were mixed in a mixer with 750 grams of a hot 10% solution of phosphoric acid-N-methylstearylamide-diamide in ethanol. After evaporating the solvent at 75° C. the mixture was worked up into granules which were injection-molded into plates. The specific transmission resistivity of the plates obtained was $10^{12}$ ohms/cm. After the plates had been rubbed with a woolen cloth an attraction of cigarette ash was not observed.

Example 26

In a mixer 75 grams of phosphoric acid-N-methylstearylamide-diamide molten at 110° C. were introduced through nozzles into 10 kilos of linear (low-pressure) polyethylene powder (density: 0.96 g./cc., specific resistivity $10^{18}$ ohms/cm.).

After thorough homogenizing the mixture was worked up into granules which were injection-molded into plates. The specific transmission resistivity of the plates obtained was $10^{12}$ ohms/cm. After being vigorously rubbed with a woolen cloth the plates did not attract cigarette ash.

Example 27

10 kilos of a branched (high-pressure) polyethylene powder having a density of 0.918 g./cc. and a specific transmission resistivity of $10^{18}$ ohms/cm. were, as described in Example 14, finished with 150 grams of phosphoric acid-N-methylstearylamide-diamide in order to acquire anti-static properties. The injection-molded plates so obtained had a transmission resistivity of $10^{12}$ ohms/cm. After being vigorously rubbed with a woolen cloth the plates did not attract cigarette ash.

Example 28

10 kilos of isotactic polypropylene-power (density: 0.905 g./cc., specific transmission resistivity $10^{18}$ ohms/cm.) were, as described in Examples 14, 15 and 16, finished with 75 grams of phosphoric acid-N-methylstearylamide-diamide in order to acquire anti-static properties.

When measured the injection-molded plates obtained according to the three processes exhibited a specific transmission resistivity of $10^{12}$ ohms/cm. After being rubbed vigorously with a woolen cloth the plates did not attract cigarette ash.

Example 29

10 kilos of a linear (low-pressure) copolymer powder composed of 90% of ethylene and 10% of propylene (density: 0.928 g./cm.², ball indentation hardness 230/205 kg./cm.², specific transmission resistivity $10^{16}$ ohms/cm.) were, according to Example 14, mixed with 75 grams of phosphoric acid-N-methylstearylamide-diamide and injection-molded into plates.

The injection-molded plates thus obtained had a specific transmission resistivity of $5 \cdot 10^{11}$ ohms/cm. After having been rubbed vigorously with a woolen cloth the plates did not attract cigarette ash.

Example 30

According to Example 16, 75 grams of phosphoric acid-N-methylstearylamide-diamide were applied to 10 kilos of polycarbonate granules (density: 1.2 g./cc., specific transmission resistivity $10^{17}$ ohms/cm.). Before homogenizing the granules on the extruder with subsequent processing in the injection-molding machine, the material thus treated was always carefully dried in a through-dryer at 120° C.

The specific transmission resistivity of the injection-molded plates thus obtained was $10^{12}$ ohms/cm. An attraction of cigarette ash was not observed after the plates had been rubbed with a woolen cloth.

Example 31

10 kilos of a granular product of linear (low-pressure) polyethylene that had, as described in Example 24, been finished with 75 grams of phosphoric acid-N-methylstearylamide-diamide in order to acquire anti-static properties were processed on the extruder into sheets by means of a slot die.

The specific transmission resistivity of the sheets so prepared was $10^{12}$ ohms/cm. An attraction of cigarette ash was not observed after the plates had been rubbed with a woolen cloth.

Example 32

200 grams of a commercial unsaturated polyester resin obtained by condensation of 5 moles of ethylene glycol with 3 moles of maleic anhydride and 2 moles of phthalic anhydride and final dissolution of the condensation product in 30% by weight of styrene, were cast into plates after the addition of 2% of methylethyl ketone peroxide, 0.1% of cobaltous naphthenate and 0.75% of phosphoric acid - N - methylstearylamide-diamide and hardened at room temperature with the exclusion of air. After being vigorously rubbed with a woolen cloth the plates did not attract cigarette ash.

Example 33

200 grams of a commercial epoxide resin on the basis of 4,4'-diphenylol propane+epichlorohydrin having an epoxide equivalent of 190 were mixed with 16 grams of diethylene triamine and 10 grams of a 20% solution of phosphoric acid-N-methylstearylamide-diamide in dibutyl phthalate and the mixture cast into a plate. After 3 hours' tempering at 50° C. the mixture of resin and hardener was hardened. After being vigorously rubbed with a woolen cloth the plates did not attract cigarette ash.

Example 34

The resin-hardener mixture obtained according to Example 33, to which had been added phosphoric acid-N-methylstearylamide-diamide, was spread with a brush on a sand blasted plate. After the resin-hardener mixture had hardened, the lacquer coat was vigorously rubbed with a woolen cloth. When tested no static charge was observed in the lacquer coat.

We claim:

1. A new composition of matter consisting essentially of (a) a high molecular weight compound selected from the group consisting of polystyrene, copolymers of styrene with butadiene, copolymers of styrene with acrylonitrile, copolymers of styrene with vinylcarbazole, polyvinyl chloride, vinyl chloride copolymers, polyterephthalates, polyolefins, polycarbonates, polyacrylonitrile, polyacrylic acid esters, polymethacrylic acid esters, polyamides, polyurethanes, polyvinyl esters, polyacetals, polymers of fluoro-olefins, cellulose derivatives, unsaturated polyesters, and epoxy resins, and (b) 0.1–7% by weight, based on the weight of the high molecular compound, of at least one organic phosphorus amide having the formulae selected from the group consisting of

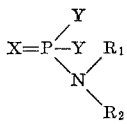

and

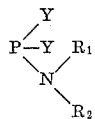

wherein X is a member selected from the group consisting of oxygen and sulfur, Y is a radical selected from the group consisting of

and $-R_2$, $R_1$ is an alkyl radical of 1–20 carbon atoms, and each $R_2$ substituent is selected from the group consisting of hydrogen, an alkyl radical of 1–20 carbon atoms, phenyl, and alkylphenyl, said phosphorus amide imparting anti-static properties to the composition.

2. The composition of claim 1 in which the hydrocarbon radicals of the phosphorus compound may be substituted by a radical selected from the group consisting of amino, hydroxy, alkoxy and carboxy-alkyl groups.

3. The composition of claim 1 wherein the phosphorus amide is phosphorus acid-N-methylstearylamide-diamide.

References Cited by the Examiner

UNITED STATES PATENTS 2,628,224 2/1953 Cairns et al.
3,134,742 5/1964 Wismer et al. _____ 260—45.9

FOREIGN PATENTS 584,539 10/1959 Canada.
853,186 11/1960 Great Britain.
1,091,078 10/1960 Germany.

ALFRED L. LEAVITT, *Primary Examiner.*

MORRIS LIEBMAN, ALEXANDER H. BRODMERKEL, *Examiners.*